March 3, 1942.　　　　H. M. DANKER　　　　2,275,009
POULTRY RACK
Original Filed July 20, 1939　　　2 Sheets-Sheet 1

Inventor:
Hugo M. Danker
By: Milo B. Stevens & Co.
Atty's.

March 3, 1942.  H. M. DANKER  2,275,009
POULTRY RACK
Original Filed July 20, 1939  2 Sheets-Sheet 2

Inventor:
Hugo M. Danker.
By: Miles B. Stevens & Co,
Atty's

Patented Mar. 3, 1942

2,275,009

UNITED STATES PATENT OFFICE 2,275,009

POULTRY RACK

Hugo M. Danker, Berwyn, Ill.

Original application July 20, 1939, Serial No. 285,608. Divided and this application March 19, 1940, Serial No. 324,873

2 Claims. (Cl. 119—22)

My invention relates to apparatus for compounding and preparing fertilizer, and more particularly to a poultry roosting unit for the supply of an important fertilizer ingredient, the present application being a division of one filed by me on July 20, 1939, under Serial No. 285,608.

One object of the improved roosting unit is to provide a rack which accommodates the poultry in comfort and is adjustable to different sizes of poultry.

A further object of the improvement is to design a poultry rack which is sanitary and presents no breeding places for vermin.

Another object of the invention is to construct the roosting unit with means to raise it out of the way when access to the space or apparatus below the same is desired.

An important object of the improvement is to provide a poultry rack which is of few and simple parts which are of a rugged character and economical to produce and assemble.

With the above objects in view and any others which may suggest themselves from the description to follow, a better understanding of the invention may be had by reference to the accompanying drawings, in which—

Figure 1:
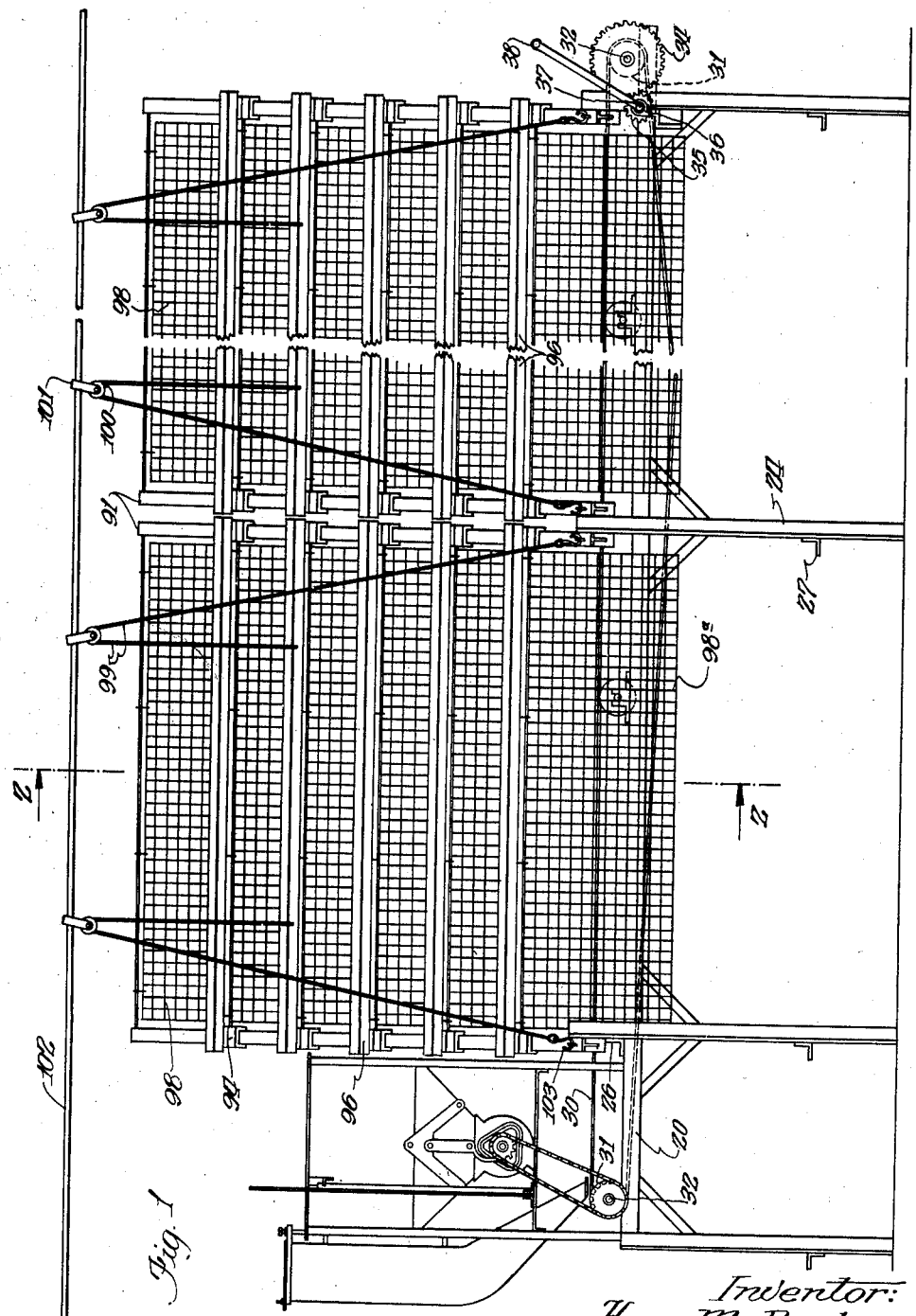
Fig. 1 is a front elevation of the apparatus, showing the novel rack partly broken away.

In accordance with the foregoing, specific reference to the drawings shows the framework of the apparatus to be of skeleton form, and largely composed of angle bars. Thus, a frontal rail is indicated at 20, a rear rail at 22, frontal uprights at 24, rear uprights at 25, upper spacers at 26, and lower spacers at 27. Braces are used wherever necessary.

The framework primarily supports a horizontal conveyor belt 30 trained over terminal rollers 31 whose shafts 32 are carried in suitable frame bearings. One of the shafts 32 receives a gear 34 with which a pinion 35 carried by a frame bracket 36 is in mesh. The pinion shaft 37 carries a crank handle 38 and provides a reduction drive for the same to operate the belt.

It is my purpose to operate the belt through the length of one run periodically, such as in the evening and in the morning. Each operation is intended to induce the deposit upon the upper belt run of a layer of sand or fine soil covered by a layer of peat, the apparatus performing this function being shown at the left-hand end of the poultry rack and more fully described in my pending application first referred to above. When the composite layer of material has attained the full length of the upper belt run, the operation of the belt is stopped, and the layer allowed the period through the night to receive the poultry droppings. In the morning the belt is again operated as in the previous instance, this action serving to unload the previous layer and take on a succeeding layer of the composite material. The unloading occurs over a receptacle from which the contents are transferred to containers for use or sale, such receptacle being illustrated in a companion application filed March 28, 1940; Ser. No. 326,511, which has become Patent No. 2,249,555, issued July 15, 1941.

Figure 2:
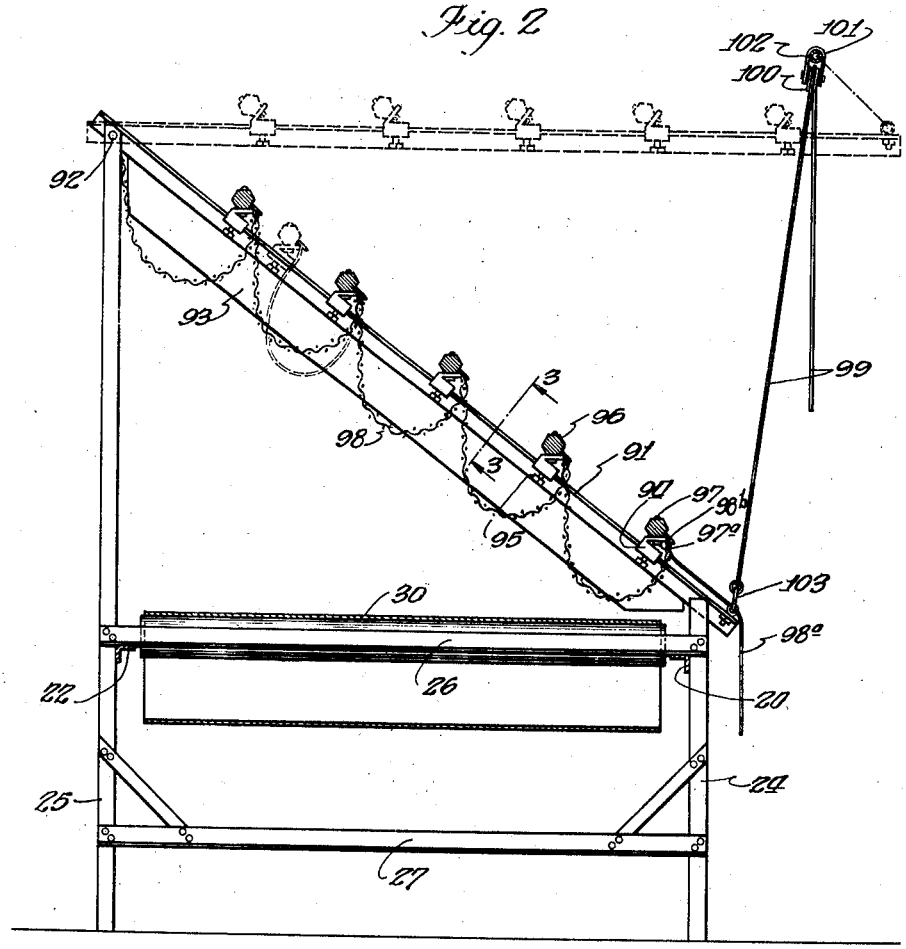
Fig. 2 is a section on the line 2—2 of Fig. 1.

The means for placing the poultry will now be described. These means occur in tiers which are longitudinally arranged, occurring between the uprights 24. Figs. 1 and 2 show only one full tier, and it will be understood that a number of tiers will be provided according to the length of the belt or the capacity of the apparatus. Each tier is in the nature of a frame having side bars 91 of T-section, the frame sloping in a forward direction and occurring between pairs of the uprights 24 and 25. The bars 91 are pivoted to the uprights 25 as indicated at 92.

Figures 3, 4:
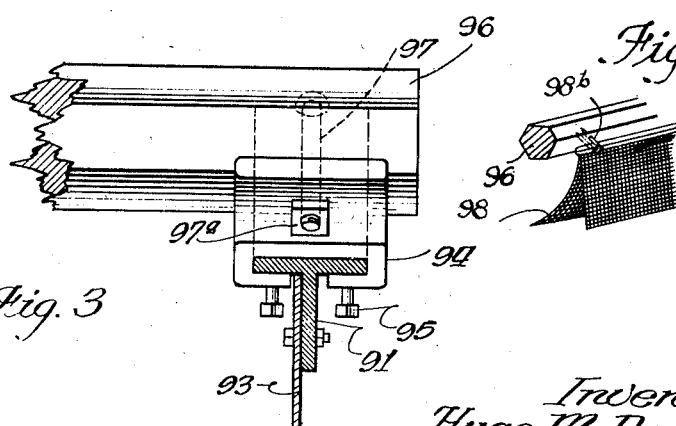
Fig. 3 is an enlarged section on the line 3—3 of Fig. 2.
Fig. 4 is a perspective detail, showing a trough suspension means.

Each frame receives a series of clamps 94 along its T-bars 91, as indicated more particularly in Figs. 2 and 3. The clamps 94 are channeled to be slidable along the T-bars; and they have set screws 95 to secure the clamps at any desired point. The tops of each pair of clamps 94 receive rails 96 of hexagonal or other angular cross section; these being secured by bolts 97 and nuts 97a. The rails 96 are intended to serve as roosts for the poultry; and troughs 98 of coarse wire netting are suspended between the rails, as indicated in Fig. 2, to serve as partitions between the frame and the space below and bar the access of the poultry to the belt 30 or the material on the same, the trough rims being attached to the rails by any suitable means, such as the staples 98b shown in Figs. 2 and 4. The troughs 98 have the particular form in order to catch such eggs as are laid by the poultry while roosting. The troughs of the tiers are separated by sheet metal strips 93 depending from the T-bars. The rails have been illustrated with a given spacing, suitable for poultry of a certain size, but in case the poultry is of a smaller size, the clamps 94 may be loosened and the rails set more closely, as suggested by dotted lines near the center of Fig.

2, so that a larger number of roosts could thus be accommodated. Of course, the situation is vice versa where the poultry is of a larger size in which event the troughs may be expanded by the separation of the roosting rails.

It has been mentioned that the roosting poultry should not have access to the belt 30 or the material carried thereby. It follows, therefore, that wire netting walls must be placed along the rear and front of the apparatus, preferably by fastening the same to the uprights 24 and 25 as well as at the ends of the apparatus, so as to prevent poultry from gaining access to the belt from directions other than the roosting zone. However, other than a frontal apron 98a, such walls have not been illustrated, first for the reason that they are not of patentable import, and second because they may unduly complicate the drawings. However, access to the upper side of the belt may be required from time to time for purposes of cleaning or other attention, and for this reason the roosting frames have been pivoted at 92 as mentioned. It is my intention to raise any roosting frame from the front for access to the space beneath the same. This may be done by any suitable means, but my preference is to provide a set of hoisting cables 99, suspending the same from sheaves 100 carried by hangers 101 slidable along a suitable stationary rod 102, and extending the cables to the front end of the T-bars 91 to make the hooking connection 103 therewith. Thus, the desired roosting frame may be raised to a position such as indicated by dotted lines in Fig. 3 and the cables secured at any convenient point to hold the frame in the elevated position.

It will be evident from the above description that I have provided a poultry rack which is closely and logically associated with the fertilizer carrier, so as to most efficiently serve the latter. At the same time, the rack is of a simple design, permitting the ventilation and ample access of air to the roosts, whereby to preclude the formation of vermin. Further, the roosting rails are simple and easily adjustable according to the size of the poultry. Finally, simple and easily operated means are provided for raising each frame of the rack for access to the carrier.

While I have described the invention along specific lines, various minor changes and refinements may be made without departing from its principle, and I desire to consider all such changes and refinements as coming within the scope and spirit of the appended claims.

I claim:

1. A roosting rack comprising a frame extending from front to rear and having a pair of T-bars at its lateral limits, a plurality of channeled clamps slidable on said bars, means for adjustably securing each clamp to its bar, a plurality of roosting rails extending in spaced parallel relation between said bars, means securing a clamp of each bar to the adjacent end of each rail, and wire fabric material connected in suspended relation to adjacent rails to form troughs between said rails, said troughs being of sufficient dimensions to permit varying the cross sectional area thereof when said rails are shifted relative to each other on said bars.

2. A roosting rack comprising a frame extending from front to rear and having a pair of T-bars at its lateral limits, a plurality of channeled clamps slidable on the head portions of said bars, means for adjustably securing each clamp to its bar, a plurality of roosting rails extending in spaced parallel relation between said bars, means securing a clamp of each bar to the adjacent end of each rail, wire fabric material connected in suspended relation to adjacent rails to form troughs between said rails, said troughs being of sufficient dimensions to permit varying the cross sectional area thereof when said rails are shifted relative to each other on said bars, and strips carried by the stem portions of the T-bars and extending alongside the ends of the troughs.

HUGO M. DANKER.